United States Patent Office 3,626,698
Patented Dec. 14, 1971

3,626,698
COMBUSTION CHAMBER CONSTRUCTION
AND METHOD OF OPERATING A COMBUSTION CHAMBER
Werner Baum, Flein, Germany, assignor to Messerschmitt-Bolkow-Blohm Gesellschaft mit beschrankter Haftung, Munich, Germany
Filed Apr. 21, 1970, Ser. No. 30,550
Claims priority, Application Germany, May 24, 1969,
P 19 26 728.8
Int. Cl. F02k 7/10
U.S. Cl. 60—270 R                                    19 Claims

ABSTRACT OF THE DISCLOSURE

A rocket type ram jet engine includes a centrally arranged streamlined displacement member which defines an annular inlet for combustion air and which provides a reservoir for a fuel component and a pressure gas for atomizing the component in a catalyst chamber. The atomized fuel component is directed into a decomposition gas chamber where it is decomposed and a portion of the decomposed gas is directed through the walls of the combustion chamber for discharge through one or more fuel nozzles in a counterflow direction in a main combustion chamber. The decomposition gases are introduced into the main combustion chamber at a location downstream of the discharge from the decomposition gas chamber. The combustion chamber is operated with decomposition gases which are obtained from hydrazine or its derivatives by catalytic decomposition. The first quantity of the decomposition gas is introduced centrally into the main combustion chamber and a second partial gas quantity is injected by nozzles into the main combustion chamber downstream of the main introduction and counter to the flow thereof.

SUMMARY OF THE INVENTION

This invention relates in general to the construction of combustion chambers and to a method of operating such chambers and in particular, to a new and useful combustion chamber particularly for a rocket ram jet engine in which fuel is burned with air oxygen in a main combustion chamber which is supplied with decomposition gases.

Air which is brought into the intakes of engines which fly at high mach flying speeds and which are of the ram jet type of known design is retarded in the intake diffuser and flows into the combustion chamber as compressed combustion air. In the combustion chamber, the air is supplied with heat and hence, with energy by means of fuel or by combustion. When combustion chambers are to be charged with air at relatively high intake velocities special problems are encountered in respect to the stabilizing of the hot flame core which is produced by the combustion of the introduced fuel centrally therein within. To avoid the thermal destruction of the combustion chamber and the succeeding thrust nozzle or of a succeeding turbine, air is admixed to the hot fuel gases of the flame core so that the process of the combustion is operated with a great excess of air. Flame holders are employed for stabilizing the flame core and they are usually in the form of annular baffles which are located in the air flow and are disposed in the front area of the combustion chamber and provide means for introducing a liquid fuel at such locations. The mechanical flame holders bring about a back flow area within the combustion chamber, or they at least favor the formation of back flow and generate secondary eddies to intensify the mixing of air and the fuel. But even such mechanical flame holders cause difficulties inasmuch as they are highly stressed thermally by the hot back flow gases of the flame core. In addition, they do not provide any guarantee that there will be optimal stabilizing conditions for the flame core over the entire speed range due to their being affixed locally in the combustion chamber, and they do not provide an adequate variation for the various intake velocities of the combustion air into the combustion chamber. In order to remedy this drawback the flame holders in test stands for ram jet engines have been made so that they may be moved axially. However, manual or automatically adjustable devices for flame holders in missiles are structurally complicated and expensive and are subject to difficulties in operation which must be avoided in all circumstances.

In order to avoid the disadvantages of the mechanical flame holding devices, it is further known to generate a retarded flow or a central back flow by injecting air in transverse or opposite directions or by injecting fuel crosswise to the combustion air flow. This provides a flow-dynamic flame stabilization.

In accordance with the invention, a combustion chamber operating method and an apparatus is provided which insures a combustion process which includes a flow dynamic flame stabilization to produce a beneficial influence on the efficiency of the combustion process and the space utilization of the combustion chamber at the same time. With the invention, the combustion chamber is operated with decomposition gases which are obtained by catalytic decomposition of the fuel which is in the form of a hydrazine and/or its derivatives or a fuel equivalent to hydrazine. The arrangement and method includes introducing a first partial gas quantity into the combustion chamber centrally or coaxially in respect to the longitudinal center line of the combustion chamber. A second partial gas quantity is injected into the combustion chamber in a direction opposite to, or crosswise to, the intake direction of the combustion air and it is preferably introduced obliquely in a forwardly oriented direction in respect to the combustion air intake. The secondary partial gas flow is introduced preferably behind the inflow plane of the first partial gas quantity and opposite to its direction of introduction.

In one form of the invention, it is proposed to provide for the second partial gas quantity in or at the combustion chamber wall by introducing this quantity through several rows of injection nozzles arranged one behind the other in the longitudinal direction. By injecting an interference flow in several transverse planes extending along the axis of the combustion chamber, an effective influence on and deflection of the combustion chamber air of the first partial gas quantity is obtained. The axially distributed admixing of the second partial gas quantity to the flow of combustion air of the first quantity results in several parallel flows of many single flame portions which accelerate the total combustion. This measure may be further intensified by varying the injection energy for the various rows of the individual injection nozzles. This generates a grid of individual fire seeds or flame areas which extend in both axial and radial directions.

According to a further characteristic of the invention, the same advantages are achieved by disposing several rows of injection nozzles so as to protrude to various depth levels into the combustion chamber and into the incoming combustion air flow. This provides a mechanically automatic and exact distribution of the second partial quantity of decomposition gases staggered and layered in axial and radial directions. The depth of engagement of the injection nozzle tubes of the various rows are arranged so as to decrease from front to the rear as viewed in the flow direction in order to assure that, with optimal distribution of the second partial quantity of decomposition gases within the air stream, the various injection nozzle tubes in series will be located in a relatively cool flow stream so that they are less subject to thermal stress.

In order to maintain as undisturbed a cool air veil as possible at the inside of the combustion chamber wall, it is proposed in accordance with the invention to dispose the injection nozzles or injection nozzle tubes at least at a certain level projecting beyond the inside of the combustion chamber wall. The tubes themselves may also be designed as additional auxiliary flame holders shaped to produce secondary eddies. A part of the decomposition gases of the second partial quantity of decomposition gases may be blown out through a plurality of ports provided around the wall of the injection nozzle tubes to thereby additionally improve the intermixing of the fuel and air. The decomposition gas generator is advantageously disposed in the displacement member of the air intake which is a centrally arranged streamlined member located at the inlet. This provides means for utilizing the catalytically produced decomposition gases as propellant gases in order to produce the starting thrust. A starting thrust nozzle is designed to follow the decomposition gas chamber. The decomposition chamber includes a plurality of ports therearound which open into partial gas flow lines which connect to the injection nozzles or injection nozzle tubes which are located within the main combustion chamber wall. In some instances, a central body may be provided at the discharge of the decomposition gas chamber in order to provide a flow back area at the front of the combustion chamber. In order to increase the output of the combustion chamber particularly for short periods of time, another propellant component may be conveyed to the combustion chamber by injector action and the available flow energy may be utilized, for example, to atomize at a liquid fuel propellant component. Either the first or the second partial gas quantities may be utilized for this purpose so that conveying energy or conveying sources are not required in addition to the energy of the gases which are generated. The quantity of secondary partial decomposition gas flow which is delivered to the combustion chamber as well as the outflow of a first partial decomposition gas into the combustion chamber may be regulated preferably as a function of the momentary build-up pressure of the inflowing combustion air so that stabilization of the flame core can be regulated in accordance with the speed of flight.

Accordingly, it is an object of the invention to provide an improved combustion chamber construction which includes a decomposition gas chamber with means for generating a first decomposition gas which is directed partially into the main combustion chamber for combustion with incoming combustion air and partially through passages for introduction into the main combustion chamber at a secondary location downstream of the first and in a direction opposite to the flow directions through the main combustion chamber.

A further object of the invention is to provide a method of operating a combustion chamber which comprises atomizing a first propellant component in a decomposition gas chamber in the presence of a catalyst to generate decomposition gases which are partially directed preferably through a nozzle discharge into a main combustion chamber while combustion air is directed into the main combustion chamber for admixture thereto, and bypassing a portion of the decomposition gases to a location in a main combustion chamber to downstream of the introduction of the first portion and in a direction opposite to the flow of direction of the combustion gases and the first portion of the decomposition gases so as to form secondary eddies preferably at the various cross sectional depths through various longitudinal locations in the combustion chamber for controlling the flame core thereof.

A further object of the invention is to provide a combustion chamber construction which includes a central streamlined deflection member located within a tubular combustion chamber at the air inlet and providing a deflection for the air for combustion which is admitted thereto and including therein means for generating decomposition gases, parts of which are discharged into the main combustion chamber and parts of which are circulated through conduits extending through the walls for the combustion chamber to a location downstream of the first introduction, and wherein there are preferably a plurality of rows of nozzles arranged along the longitudinal length of the combustion chamber for introducing the secondary decomposition gas flow, the nozzle members being such that they terminate at the walls of the combustion chamber or comprise tubes which extend into the combustion chamber at various depths of penetrations.

A further object of the invention is to provide a combustion chamber construction which is simple in design, rugged in construction, and economical to manufacture.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
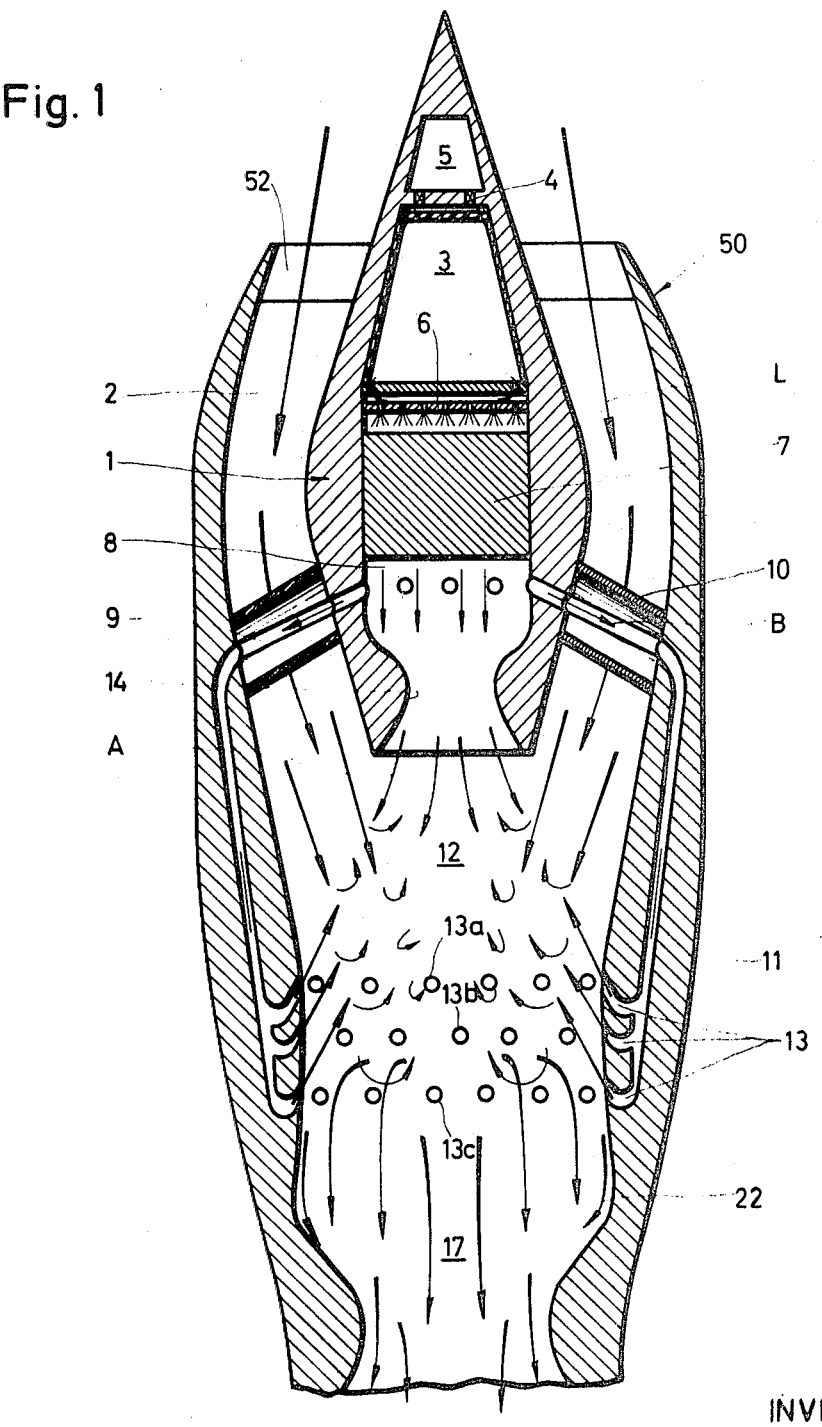
FIG. 1 is a longitudinal sectional view of a rocket ram jet engine constructed in accordance with the invention.

Referring to the drawings in particular, the invention embodied therein in FIG. 1 comprises a combination rocket-ram jet engine generally designated 50 which includes a tubular engine housing 11 having a central streamlined displacement member generally designated 1 which is supported therein by support braces 10 in a manner to define an annular inlet 52 for combustion air which flows through a supersonic intake passage 2.

In accordance with the invention, the displacement member 1 includes an elastically compressible reservoir 3 for a catalytically decomposable propellant component in the form of hydrazine. A pressure gas is admitted through regulating valves 4 from a pressure gas container 5 and it flows into the reservoir 3 in order to provide means for atomizing the propellant component and conveying it for discharge through atomizer nozzles 6. The atomizer nozzles 6 are arranged at the front end of a catalyst chamber 7 which contains a catalyst which provides a reaction with the hydrazine to form decomposition gases in a chamber portion 8. The decomposition gases which are formed in the gas chamber 8 are divided into a first partial gas quantity B which is branched off from the total quantity of gases produced and conducted through lines 9 which extend through the support braces 10 and which continues through the walls of the engine housing 11 into a main combustion chamber 12. This partial gas quantity B is reintroduced through a plurality of rows of fuel nozzles 13 designated 13a, 13b, and 13c in the individual longitudinally spaced rows. Successive rows in a longitudinally or axial direction are staggered in order to provide for a desirable eddying effect by the introduction of the secondary decomposition gases In addition to the partial gas quantity B the combustion air L which moves through the intake passage 2 feeds it to the combustion chamber 12 in an annular flow pattern which joins the main decomposition gases exiting from the decomposition chamber 8 of the supersonic nozzle 14. These second partial flow of decomposition gases in the form of a supersonic flow A move into the combustion chamber 12 and branch outwardly to intersect the air flow L as indicated by the arrows. The combustion chamber 12 terminates at its trailing or rear end in a main thrust nozzle 17.

The method of operating the engine 15 is as follows:

During the flight of an aircraft or rocket having the engine 50 combustion air is taken in the direction of the arrows L and it is directed in the nozzle like annular passage 2 toward the trailing end of the central displacement member 1. Gases are formed in the catalyst chamber 7 by the spraying of the propellant component from the reservoir 3 through the nozzle 6. Some of the gas which is decomposed in the chamber portion 8 following the catalyst chamber 7 is directed through the conduits 9 as partial gas flows B which are directed outwardly in a reverse manner through the rows of nozzles 13a, 13b, and 13c. Because of the injection of the partial gas quantity B through the nozzles 13a, 13b, and 13c, in the main combustion chamber 12 in an oblique direction opposite to the general flow direction of the air L and against the direction of the partial gas quantity A, a flame stabilization is effected in the form of a flow dynamic flame stabilizing action at great inflow velocties of the two flows A and L. The flame core, that is, the stoichiometric combustion or flame-out concentrated over a short distance and kept away from the thermally sensitive combustion chamber walls. The multiple rows of the injection nozzles 13a, 13b, and 13c assures a multi-layered deflection of the flows A and L. This is enhanced when the gas quantity B is injected with varying injection power and it is further changed when instead of the injection nozzle 13 there are employed injection nozzle tubes 113a, 113b, and 113c, and 113d, as indicated for the combustion chamber generally designated 50' of FIG. 2. With this latter construction, a multi-shelled flame core resembling an onion is formed.

Figure 2:
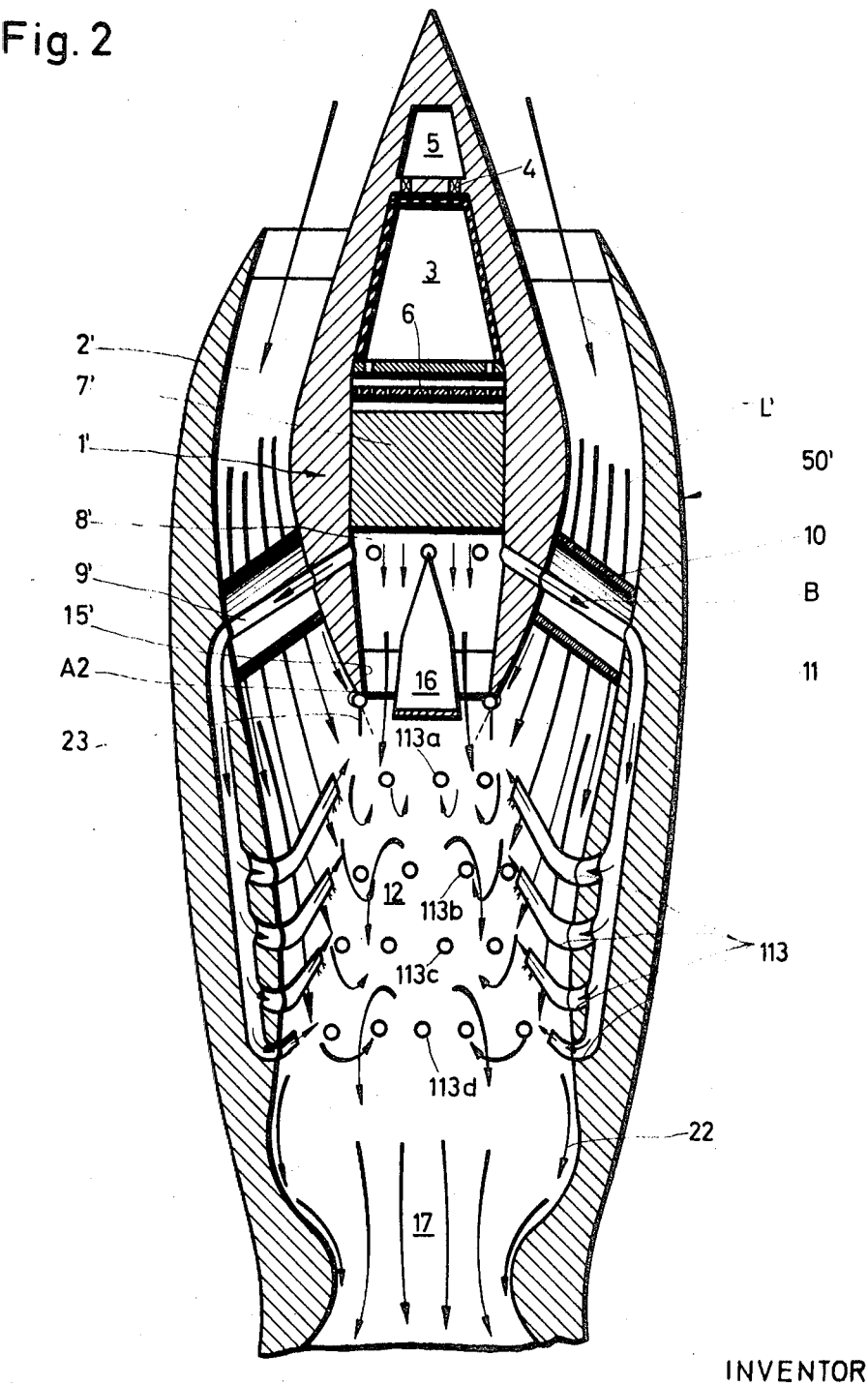
FIG. 2 is a view similar to FIG. 1 of another embodiment of the invention.
Figure 3:
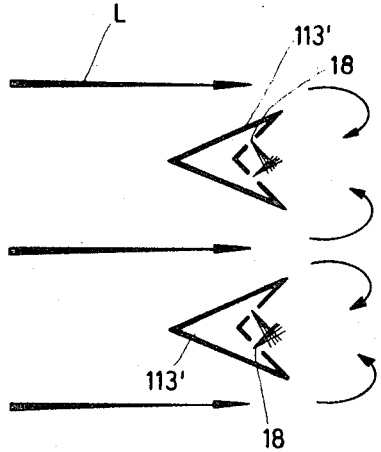
FIG. 3 is a schematic representation of another embodiment of the invention.

As indicated in the embodiment of FIG. 2, the injection nozzle tubes 113 may be designed as auxiliary flame holders or secondary baffles as is indicated in the construction 113' shown in FIG. 3. This latter construction ensures an intermixing of combustion air L and partial gas quantity B because the triangular shape formation of the baffles is such that the widened base portion of the triangle at the downstream end provides a pull on the gases or air L which blows thereby to promote eddying in the construction shown in FIG. 3, the nozzle tubes 113 also carry means for directing an additional propellant component outwardly into the gas or air stream through nozzles 18 which are arranged such that the sprays intersect at the trailing end thereof.

As indicated in FIG. 2, the nozzle tubes 113 of each of the successive rows are advantageously formed so that the mouths of each are either offset in a longitudinal direction or arranged substantially in the same longitudinal plane. By an arrangement in which the mouths reach radially outwardly to substantially the termination of the mouth the next adjacent row of nozzles there is little likelihood that thermal destruction of the nozzles tubes will occur, and in addition the air flow L is charged with decomposition gases in a spacially arranged bridge shaped pattern.

In the arrangement of FIG. 2, the engine 50' is constructed substantially the same as that of FIG. 1, with the exception of the formation of the nozzle tubes 113 and also the formation of a central body 16 as a coaxially annular flow member arranged at the discharge of the decomposition gas chamber 8'. This causes the partial gas flow to divide around the body 16 and form a coaxial annular flow A2. Flaps 23 are arranged adjacent the end of the nozzle 15' and control the outlet profile. The flaps 23 are adjusted by the inflowing combustion air L' in the sense that, with increasing air throughput, with any consequent buildup of pressure the outlet profile of the thrust nozzle 15 and with it also partial gas quantity A2 becomes increased. The partial gas quantity B is increased due to the increasing pressure in the decomposition gas chamber 8'. This causes the allotment of more retarding and stabilizing energy for the combustion process in the combustion chamber 12' in order to compensate for the greater inflow velocity or relatively greater inflow output of flows A and L. The control flaps 23 are preloaded upon impact by a turning spring 23a.

Figure 4:
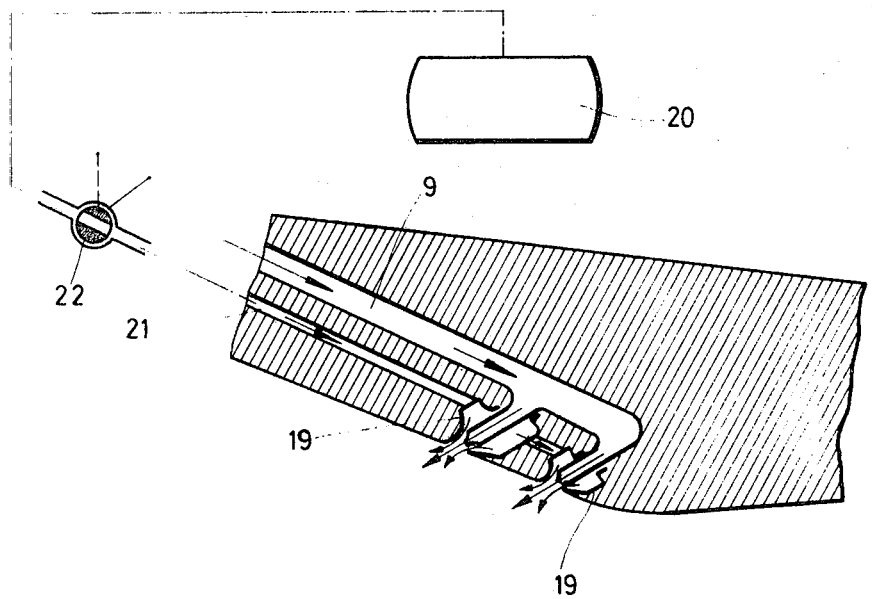
FIG. 4 is a partial longitudinal sectional view showing another arrangement for the novel construction of the invention.

The partial longitudinal sectional view showing another arrangement for the novel construction of the invention shown in FIG. 4 comprises a combination rocket-ram jet engine as in the other embodiments, but in this embodiment the injection nozzles are components of the jet-type pumps, generally designated 19, in which another propellant component is conveyed into the combustion chamber 12 by injector action. This is particularly a high energy fuel which is delivered from a tank 20 through the lines 21 and a regulating or shut-off valve 22 in a controlled quantity, in particular for peak performance only.

The combination rocket-ram jet engine starts with a catalytically produced decomposition gas and it is accelerated by such gases to a speed at which the ram jet operation can then be taken up. Basically, the following advantages are gained by the invention: There is a forced creation of a central back flow area in which the hot flame core is flow-dynamically localized and stabilized. The second partial gas quantity B oriented crosswise or, particularly, in opposing or oblique direction to the first partial gas quantity flowing in centrally, permits a greater entry velocity for the combustion air L and the centrally introduced first partial gas quantity A thereby increasing the combustion chamber throughput and, hence, the specific combustion chamber output. Furthermore, the other partial gas quantity, acting locally upon the inflowing combustion air and upon the first partial gas quantity which flows in centrally as a retarding or interfering flow, shortens the flame-out distance, thereby making the combustion chamber shorter also. In addition, the radially inner and outer superficies of the inflowing combustion air are simultaneously brought into contact with, or penetrated by and mixed with, the combustible decomposition gases.

What is claimed is:

1. A method of operating a combustion chamber having an air inlet end and an opposite thrust nozzle discharge forming a rocket-ram jet engine, comprising generating decomposition gases from a substance such as hydrazine by catalytic decomposition, directing a first quantity of decomposition gases centrally into the combustion chamber into the inlet air flow and in a direction toward the nozzle discharge, and directing a second quantity of decomposition gases into the combustion chamber against the inflow direction of the combustion air and said first quantity of decomposition gases at a location downstream thereof.

2. A method, according to claim 1, wherein the combustion chamber includes a central displacement member diverting the inlet air into an annular flow toward said nozzle discharge, and wherein the decomposition gases are generated within said displacement member and wherein a portion of said gases constituting said first quantity of decomposition gases being directed into said combustion chamber from the trailing end of said displacement member, said second quantity of decomposition gases being led from said displacement member through the walls of said combustion chamber and discharged into said combustion chamber in a direction interfering with the flow of the combustion air and the first quantity of decomposition gases.

3. A method, according to claim 2, wherein said gases are directed in a direction oblique to the direction of movement of said first quantity of decomposition gases and said combustion air.

4. A method, according to claim 1, wherein said second quantity of decomposition gases are directed into said combustion chamber downstream of said first quantity of decomposition gases along with an additional propellant component.

5. A method, according to claim 4, wherein said second quantity of decomposition gases induces the flow of the second propellant component.

6. A method, according to claim 5, wherein the quantity of decomposition gases of said second gas quantity is regulated by controlling the outlet flow area of said first partial gas quantity from said displacement member as a function of the buildup pressure of the inflowing combustion air.

7. A combination rocket ram jet combustion engine construction, comprising a tubular member having an inlet at one end and an opposite end with a thrust nozzle discharge, a displacement member located within said inlet end and having a streamlined formation and diverting air for combustion into an annular stream therearound toward said discharge end, the interior of said tubular member defining a main combustion chamber at the inner end of said displacement member, means in said displacement member for generating decomposition gases and for directing a portion of said generated gases into said main combustion chamber, means for diverting a portion of the decomposition gases from said displacement member to a location in said main combustion chamber spaced rearwardly therefrom and for discharging said gases into said combustion chamber in a direction to interfere with the flow of said first quantity of decomposition gases and said combustion air.

8. A combustion chamber, according to claim 7, wherein said means for directing the second quantity of decomposition gases into said combustion chamber includes a plurality of nozzles arranged in rows one behind the other in a longitudinal direction of said combustion chamber.

9. A combustion chamber, according to claim 7, including a plurality of longitudinally spaced rows of nozzles comprising said means for directing said second quantity of decomposition gases into said combustion chamber, said nozzles being spaced longitudinally along the length of said combustion chamber and being of a construction such that the decomposition gases are introduced with varying force in each succeeding row.

10. A combustion chamber, according to claim 7, wherein said means for directing said second quantity of decomposition gases into said combustion chamber includes at least one row of injection nozzle tubes which extend outwardly into said combustion chamber.

11. A combustion chamber, according to claim 10, wherein these are plurality of rows of said nozzle tubes arranged one behind the other and which project into the combustion chamber gas flow to different depth levels.

12. A combustion chamber, according to claim 7, wherein said means for directing said second quantity of decomposition gases into said combustion chamber includes a plurality of rows of nozzle tubes with the tubes extending into the combustion chambers by depths which decrease in a direction from the inlet end to the discharge end of the combustion chamber.

13. A combustion chamber, according to claim 7, wherein said means for directing said second quantity of decomposition gases into said combustion chamber includes a plurality of nozzle tubes which project it to the combusion chamber at least to such a level beyond the inside thereof so that a cool air veil, which is not affected by the gases discharged therefrom remains intact, alongside of the combustion chamber wall particularly up to the narrowest nozzle neck portion.

14. A combusion chamber, according to claim 7. wherein said means for directing the second quantity of decomposition gases into said combustion chamber comprises nozzle holders having means for inducing the flow of a fuel propellant along with said gases into said combustion chamber.

15. A combusiton, chamber, according to claim 7, wherein said means for directing said second quantity of decomposition gases into said combustion chamber includes a plurality of triangular shaped nozzle members having an apex projecting into the air flow and a trailing portion around which the air flow tends to eddy having means for injecting said decomposition gases thereon.

16. A combustion chamber, according to claim 7, wherein there are a plurality of rows of nozzles for discharging said gases into said combustion chamber arranged in longitudinally spaced relationship, the nozzles of adjacent rows having mouths which extend only to the radial inner level of the nozzle of the next adjacent row.

17. A combustion chamber, according to claim 7, wherein said displacement member includes a plurality of openings therein for the flow of said second quantity of decomposition gases, a conduit connected to each opening and extending along the wall of said combustion chamber to said means for directing said decomposition gases into said combustion chamber.

18. A combustion chamber, according to claim 7, wherein said displacement member includes a thrust nozzle discharge.

19. A combustion chamber, according to claim 18, wherein said thrust nozzle discharge includes a central body arranged within said nozzle discharge and diverting the gas flow of decomposition gases into an annular flow into said main combustion chamber.

References Cited

UNITED STATES PATENTS

| 3,279,187 | 10/1966 | Lindman | 60—261 X |
| 3,046,742 | 7/1962 | Egbert et al. | 60—246 X |
| 2,952,122 | 9/1960 | Fox | 60—261 |
| 2,679,137 | 5/1954 | Probert | 60—270 X |
| 2,942,413 | 6/1960 | Corbett | 60—261 X |

FOREIGN PATENTS

| 665,446 | 1/1952 | Great Britain | 60—261 |

DOUGLAS HART, Primary Examiner

R. ROTHMAN, Assistant Examiner

U.S. Cl. X.R.

60—39.72, 207, 261